United States Patent
Pearson et al.

(10) Patent No.: US 7,275,160 B2
(45) Date of Patent: Sep. 25, 2007

(54) TRUSTED SYSTEM

(75) Inventors: Siani Lynne Pearson, Bristol (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 09/932,476

(22) Filed: Aug. 17, 2001

(65) Prior Publication Data
US 2002/0023032 A1 Feb. 21, 2002

(30) Foreign Application Priority Data
Aug. 18, 2000 (GB) .................................. 0020416.4

(51) Int. Cl.
*G06F 21/00* (2006.01)
(52) U.S. Cl. ..................................... 713/172
(58) Field of Classification Search .................. 705/65; 713/172, 201, 169
See application file for complete search history.

(56) References Cited

U.S. PATENT DOCUMENTS

| | | | | |
|---|---|---|---|---|
| 5,272,754 A | * | 12/1993 | Boerbert | 713/159 |
| 5,475,756 A | * | 12/1995 | Merritt | 705/73 |
| 5,721,781 A | * | 2/1998 | Deo et al. | 705/67 |
| 5,794,054 A | * | 8/1998 | Le et al. | 710/240 |
| 6,253,324 B1 | * | 6/2001 | Field et al. | 713/187 |
| 6,694,436 B1 | * | 2/2004 | Audebert | 726/9 |
| 6,772,331 B1 | * | 8/2004 | Hind et al. | 713/151 |
| 6,785,815 B1 | * | 8/2004 | Serret-Avila et al. | 713/176 |
| 6,925,566 B1 | * | 8/2005 | Feigen et al. | 713/187 |

FOREIGN PATENT DOCUMENTS

WO  WO 00/48063  8/2000

\* cited by examiner

*Primary Examiner*—Gilberto Barrón, Jr.
*Assistant Examiner*—Andrew L Nalven (57) ABSTRACT

A method for allowing a financial transaction to be performed using a electronic system, the method comprising interrogating an electronic transaction terminal with an electronic security device to obtain an integrity metric for the electronic financial transaction terminal; determining if the transaction terminal is a trusted terminal based upon the integrity metric; allowing financial transaction data to be input into the transaction terminal if the transaction terminal is identified as a trusted terminal.

10 Claims, 5 Drawing Sheets

TRUSTED SYSTEM

BACKGROUND ART

Point-of-sale payment terminals are physical checkout devices currently used for credit, debit and smart card transactions, typically used in shops and small businesses and mainly owned by merchants and banks. These devices capture payment information at the point of sale and quickly transfer it from the merchant counter to the payment network for approval. An example provider is VeriFone™. Current products enable support for multiple applications or services—such as loyalty programs, payment, smart card processing—at the point-of-sale. Furthermore, multiple applications, created by different developers, can reside on one terminal and yet remain separate. Various handheld and countertop peripheral products support multiple options for secure PINpad and smart card applications at the point of sale. These products allow merchants to accept both debit and smart card forms of payment.

However, various types of software attack are possible on these systems, additionally there is a danger that the merchant may cheat the customer out of money by putting through too much money or putting through a transaction twice.

It is desirable to improve this situation.

SUMMARY OF THE INVENTION

In accordance with a first aspect of the present invention there is provided a method for allowing a financial transaction to be performed using a electronic system, the method comprising interrogating an electronic transaction terminal with an electronic security device to obtain an integrity metric for the electronic financial transaction terminal; determining if the transaction terminal is a trusted terminal based upon the integrity metric; allowing financial transaction data to be input into the transaction terminal if the transaction terminal is identified as a trusted terminal.

Preferably the method further comprises the providing of user identification data for the user of the electronic security data to the transaction terminal via the security device to allow authorisation of the transaction associated with the financial transaction data.

In accordance with a second aspect of the present invention there is provided a financial transaction system comprising an electronic financial terminal; an electronic security device having interrogation means for interrogating the electronic financial transaction terminal to obtain an integrity metric for the electronic financial transaction terminal, determining means for determining if the transaction terminal is a trusted terminal based upon the integrity metric, means for allowing financial transaction data to be input into the transaction terminal if the transaction terminal is identified as a trusted terminal.

In accordance with a third aspect of the present invention there is provided an electronic security transaction device having interrogation means for interrogating an electronic financial transaction terminal to obtain an integrity metric for the electronic financial transaction terminal, determining means for determining if the transaction terminal is a trusted terminal based upon the integrity metric, means for allowing financial transaction data to be input into the transaction terminal if the transaction terminal is identified as a trusted terminal.

This invention seeks to provide secure payment transactions that can be used by customers in establishing trustworthiness of the payment procedure when entering into a transaction via a transaction terminal, otherwise known as a payment terminal, by means of the integrity checking of functional components in the payment terminal. Additionally, trusted feedback to the customer and a secure payment protocol can also be optionally provided.

The invention applies to all types of payment terminals, including countertop, portable or wireless payment terminals.

Preferably trusted functionality is added to payment terminals in order to enhance the trustworthiness of the payment terminals and allow a user to check whether the transaction operation and payment is made in the expected manner.

Additionally, this invention seeks to provide the user with increased trust and confidence in the payment transaction operation by means of defining a trusted transaction payment protocol and being able to check that this trusted transaction payment protocol is carried out.

Preferably the payment terminal can be trusted by means of mutual authentication between the payment terminal and the electronic security device in addition to the electronic security device, for example a secure token or trusted personal device, carrying out an integrity check on the payment terminal. Either the result of this check is implicit, and the protocol will only be allowed to continue if the token or trusted personal device is satisfied as to the payment terminal's integrity, or the result of the check can be explicit, whereby the result of this check will be displayed on the trusted personal device or else a user's secret image will be displayed on the payment terminal itself. In the latter case the payment terminal should delete the secret once the transaction is complete, and part of the integrity check on the payment terminal should ensure that the terminal is configured for this to take place. If the result of the check is explicit, the user will only continue with the transaction payment if they are satisfied as to the trustworthiness of the payment terminal. Optionally, any result displayed to the user can include information relating to the trustworthiness of the bank.

Preferably the user's token or trusted personal device displays an image on the payment terminal with another special secret stored within the token or trusted personal device and previously unknown to the payment terminal, or else by displaying directly onto the trusted personal device.

Preferably user authorisation for continuing the procedure of purchasing goods is by means of a hardware switch or software button that the consumer must press. The payment will be made once this button/switch is pressed. The software button could be associated with the image on the payment terminal or else could be displayed on the trusted personal device.

Preferably compartmentalisation within the payment terminal is used to separate different types of transaction, such as different customers' transactions, different types of transaction (e.g. smart card, swipe card and debit card) or different banks.

Preferably compartmentalisation within the trusted personal device is used to separate different types of communication.

Preferably the electronic security device is a wireless trusted personal device on which the various images are displayed so that the consumer does not have to be in the same location as the payment terminal and therefore does not have to make payments at fixed points.

The invention seeks to provide the advantage of allowing a customer to be able to trust that the payment operation can be trusted; that is to say that the payment operation will be carried out in an expected manner. This involves the customer needing to trust that the terminal itself is operating in the expected manner, that the bank is trustworthy, that the amount paid by the customer will be the amount that the customer expects to be charged, that the customer is buying the goods s/he expects.

DESCRIPTION OF THE DRAWINGS

Embodiment of the present invention will now be described in detail with reference to the accompanying drawings, of which.

DESCRIPTION OF THE PREFERRED EMBODIMENT

For the purposes of this preferred embodiment a smart card is used as the security token, i.e. electronic security device, held by consumers. However, the security token could be, for example, secure pinpads, trusted PDAs or other trusted mobile computing apparatus. Optionally, these devices could themselves be trusted computing platforms containing a trusted component, as described below.

In this preferred embodiment, there are four entities involved in the procedure of purchasing goods. They are an off-line certificate authority (CA) (not shown), a consumer with a smart card (SC) 19, a payment terminal 10, i.e. electronic financial transaction terminal, with a trusted component (TC1), and a remote bank platform with a trusted component (TC2) (not shown).

Figure 1:
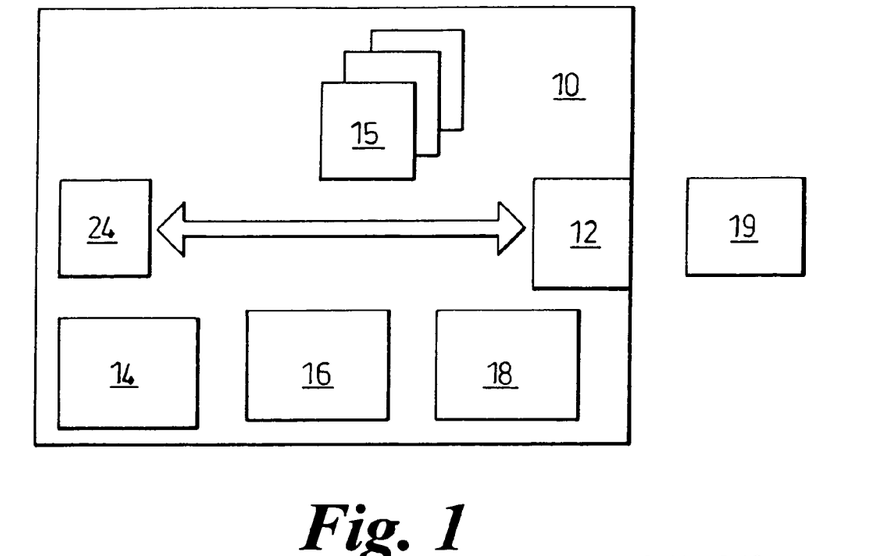
FIG. 1 is a diagram that illustrates a system capable of implementing embodiments of the present invention.

A platform 10 containing a trusted component, for example the payment terminal, is illustrated in the diagram in FIG. 1. The platform 10 includes the standard features of a keyboard 14, mouse 16 and visual display unit (VDU) 18, which provide the physical 'user interface' of the platform. In addition, the platform 10 has a trusted input device, in this case a trusted switch 11, which is integrated into the keyboard. This embodiment of a trusted platform also contains a smart card reader 12 and a local area network (not shown) which in turn is connected to the internet (not shown). Along side the smart card reader 12, there is illustrated a smart card 19 to allow trusted user interaction with the trusted platform as shall be described further below. In the platform 10, there are a plurality of modules 15: these are other functional elements of the trusted platform of essentially any kind appropriate to that platform (the functional significance of such elements is not relevant to the present invention and will not be discussed further herein).

Figure 2:
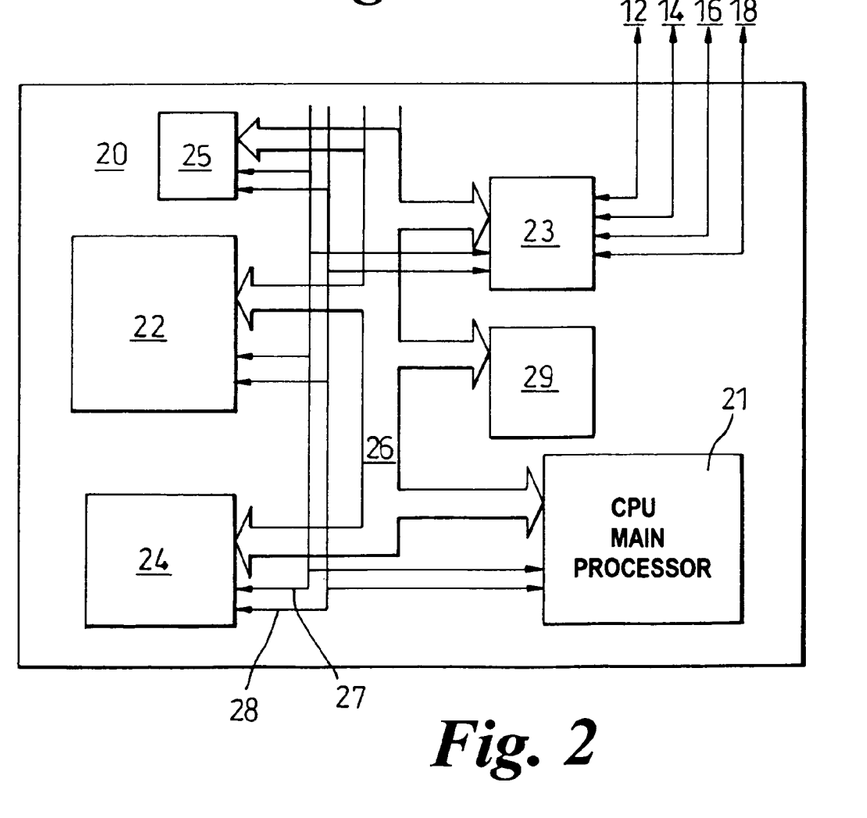
FIG. 2 is a diagram which illustrates a motherboard including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the VDU 18. Additionally, the motherboard 20 includes a LAN (local area network) adaptor 25 for connecting the platform 10 to a LAN (not shown), via which the platform 10 can communicate with other host computers (not shown), such as file servers, print servers or email servers, and the Internet. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte do the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT (TM), which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (IM) (which could otherwise occur if rogue software processes are present) and prevents rogue software processes creating a situation in which the BIOS (even if correct) fails to build the proper environment for the operating system. Although, in the preferred embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present. Additionally, trusted device 24 handles all standard display functions plus a number of further tasks, which will be described in detail below. 'Standard display functions' are those functions that one would normally expect to find in any standard platform 10, for example a PC operating under the Windows NT™ operating system, for displaying an image associated with the operating system or application software.

Figure 3:
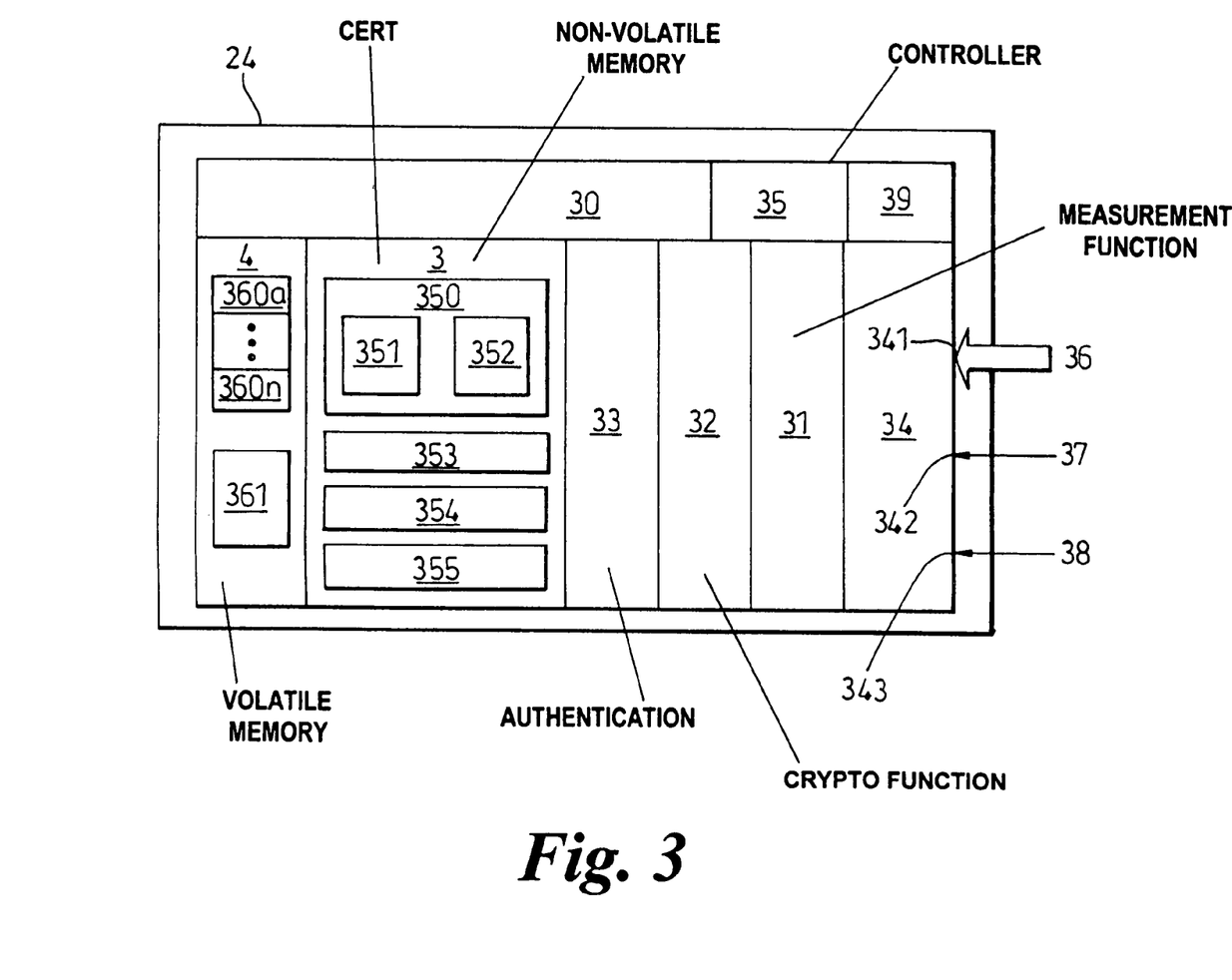
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20 for receiving, inter alia, signals from the trusted switch 11 and image data (i.e. graphics primitives) from the processor 21 and also trusted image data from the smartcard 19, as will be described. Additionally, the trusted device 24 includes frame buffer memory 35, which comprises sufficient VRAM (video RAM) in which to store at least one full image frame (a typical frame buffer memory 315 is 1-2 Mbytes in size, for screen resolutions of 1280× 768 supporting up to 16.7 million colours); and a video DAC (digital to analogue converter) 39 for converting pixmap data into analogue signals for driving the (analogue) VDU 18.

Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

It will be apparent from FIG. 3 that the frame buffer memory 35 is only accessible by the trusted device 24 itself, and not by the processor 21. This is ensures that the processor 21, or, more importantly, subversive application programs or viruses, cannot modify the pixmap during a trusted operation. Of course, it would be feasible to provide the same level of security even if the processor 21 could directly access the frame buffer memory 35, as long as the trusted device 24 were arranged to have ultimate control over when the processor 24 could access the frame buffer memory 35. Obviously, this latter scheme would be more difficult to implement.

A typical process by which graphics primitives are generated by a platform 10 will now be described by way of background. Initially, an application program, which wishes to display a particular image, makes an appropriate call, via a graphical API (application programming interface), to the operating system. An API typically provides a standard interface for an application program to access specific underlying display functions, such as provided by Windows NT™, for the purposes of displaying an image. The API call causes the operating system to make respective graphics driver library routine calls, which result in the generation of graphics primitives specific to a display processor, which in this case is the trusted device 24. These graphics primitives are finally passed by the processor 21 to the trusted device 24. Example graphics primitives might be 'draw a line from point x to point y with thickness z' or 'fill an area bounded by points w, x, y and z with a colour a'.

The control program of the controller 30 controls the controller to provide the standard display functions to process the received graphics primitives, specifically:

receiving from the processor 21 and processing graphics primitives to form pixmap data which is directly representative of an image to be displayed on the VDU 18 screen, where the pixmap data generally includes intensity values for each of the red, green and blue dots of each addressable pixel on the VDU 18 screen;

storing the pixmap data into the frame buffer memory 35; and periodically, for example sixty times a second, reading the pixmap data from the frame buffer memory 35, converting the data into analogue signals using the video DAC and transmitting the analogue signals to the VDU 18 to display the required image on the screen.

Apart from the standard display functions, the control program includes a function to mix display image data deceived from the processor 21 with trusted image data to form a single pixmap. The control program also manages interaction with the cryptographic processor and the trusted switch 11.

The trusted device 24 forms a part of the overall 'display system' of the platform 10; the other parts typically being display functions of the operating system, which can be 'called' by application programs and which access the standard display functions of the graphics processor, and the VDU 18. In other words, the 'display system' of a platform 10 comprises every piece of hardware or functionality which is concerned with displaying an image.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a-360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
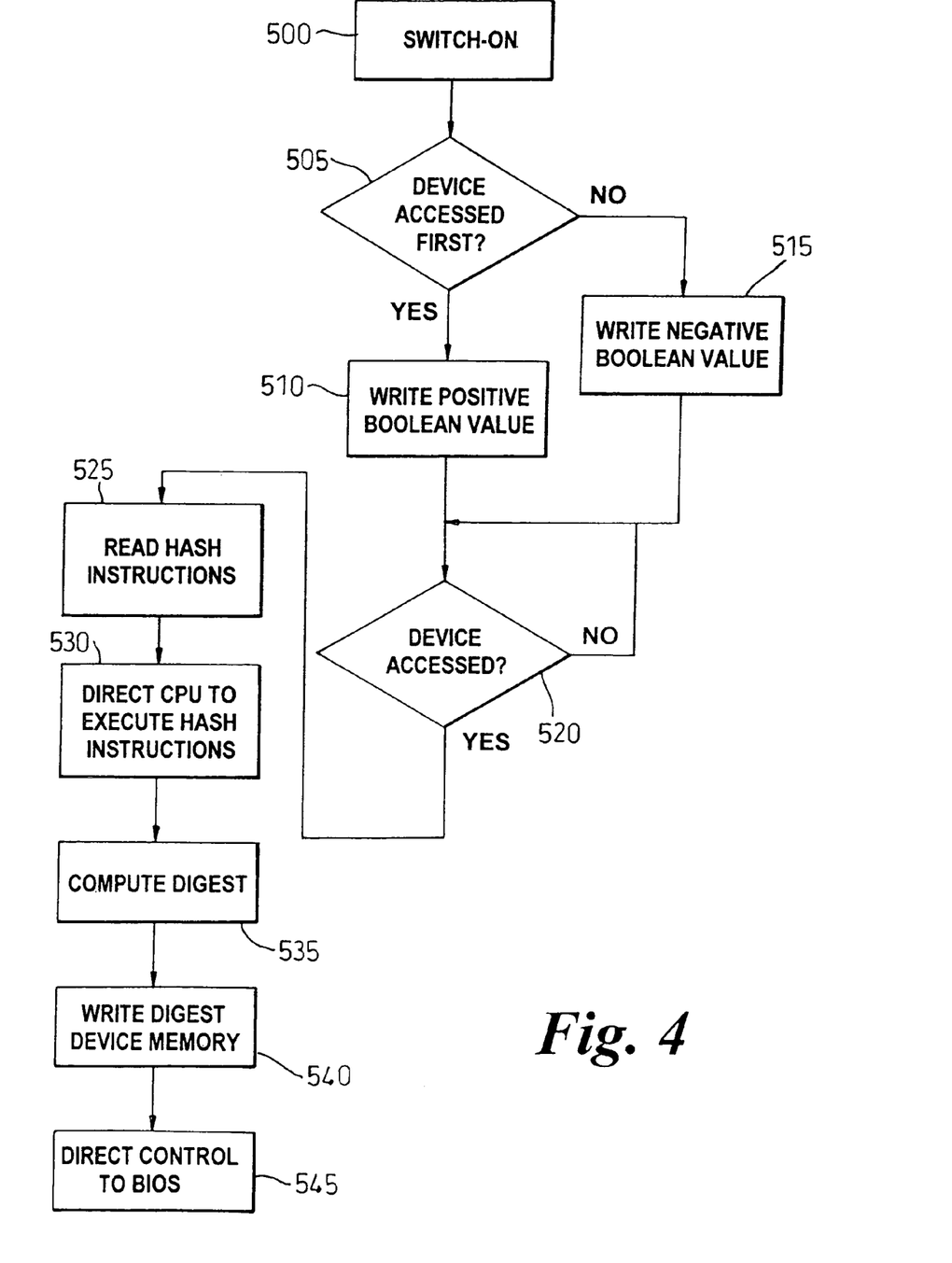
FIG. 4 is a flow diagram which illustrates the steps involved in acquiring an integrity metric of the computing apparatus.

A preferred process for acquiring an integrity metric will now be described with reference to FIG. 4.

In step 500, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory first in order to execute the BIOS program. However, in accordance with the present embodiment, the main processor 21 is directed to the trusted device 24, which acts as a memory. In step 505, if the trusted device 24 is the first memory accessed, in step 510, the measurement function 31 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 520, when (or if) accessed as a memory by the main processor 21, the main processor 21 reads the stored native hash instructions 354 from the measurement function 31 in step 525. The hash instructions 354 are passed for processing by the main processor 21 over the data bus 26. In step 530, main processor 21 executes the hash instructions 354 and uses them, in step 535, to compute a digest of the BIOS memory 29, by reading the contents of the BIOS memory 29 and processing those contents according to the hash program. In step 540, the main processor 21 writes the computed digest 361 to the appropriate non-volatile memory location 4 in the trusted device 24. The measurement function 31, in step 545, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 14 and the platform. Also, although in the present embodiment the trusted device 24 utilises the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
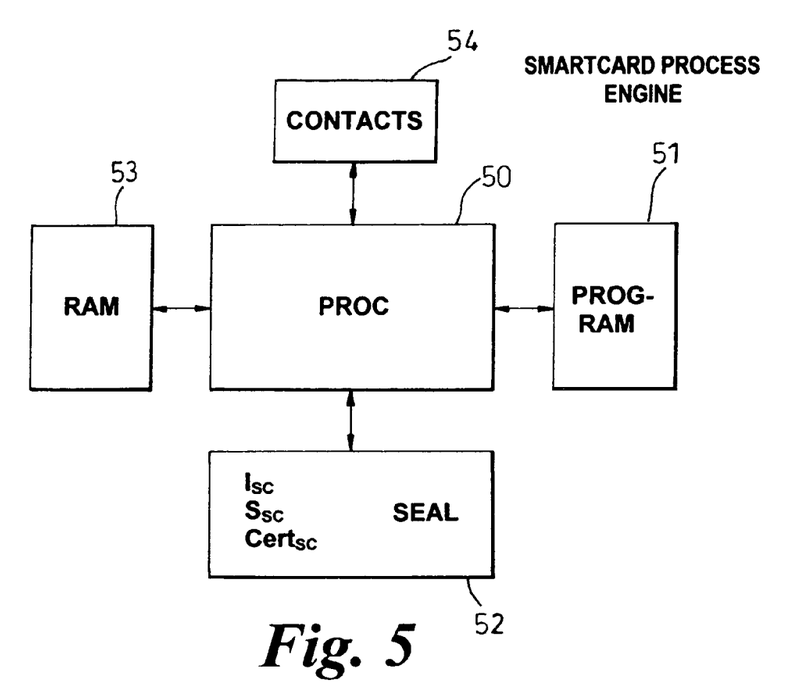
FIG. 5 is a diagram which illustrates a hardware architecture of a smart card processing engine suitable for operating in accordance with the preferred embodiment of the present invention.

As already mentioned, the present embodiment relies on interaction between the trusted device 24 and the user's smartcard 19. The processing engine of a smartcard suitable for use in accordance with the preferred embodiment is illustrated in FIG. 5. The processing engine comprises a processor 400 for enacting standard encryption and decryption functions, to support digital signing of data and verification of signatures received from elsewhere. In the present embodiment, the processor 50 is an 8-bit microcontroller, which has a built-in operating system and is arranged to communicate with the outside world via asynchronous protocols specified through ISO 7816-3, 4, T=0, T=1 and T=14 standards. The smartcard also comprises non-volatile memory 52, for example flash memory, containing an identifier $I_{SC}$ of the smartcard 19, a private key $S_{SC}$, used for digitally signing data, and a certificate $Cert_{SC}$, provided by a trusted third party certification agency (CA), which binds the smartcard with public-private key pairs and includes the corresponding public keys of the smartcard 19 (the same in nature to the certificate $Cert_{Dp}$ 350 of the trusted device 24). Further, the smartcard contains 'seal' data SEAL in the non-volatile memory 52, which can be represented graphically by the trusted device 24 to indicate to the user that a process is operating securely with the user's smartcard, as will be described in detail below. In the present embodiment, the seal data SEAL is in the form of an image pixmap, which was originally selected by the user as a unique identifier, for example an image of the user himself, and loaded into the smartcard 19 using well-known techniques. The processor 50 also has access to volatile memory 53, for example RAM, for storing state information (such as received keys) and providing a working area for the processor 50, and an interface 54, for example electrical contacts, for communicating with a smart card reader.

Seal images can consume relatively large amounts of memory if stored as pixmaps. This may be a distinct disadvantage in circumstances where the image needs to be stored on a smartcard 19, where memory capacity is relatively limited. The memory requirement may be reduced by a number of different techniques. For example, the seal image could comprise: a compressed image, which can be decompressed by the trusted device 24; a thumb-nail image that forms the primitive element of a repeating mosaic generated by the trusted device 24; a naturally compressed image, such as a set of alphanumeric characters, which can be displayed by the trusted device 24 as a single large image, or used as a thumb-nail image as above. In any of these alternatives, the seal data itself may be in encrypted form and require the trusted device 24 to decrypt the data before it can be displayed. Alternatively, the seal data may be an encrypted index, which identifies one of a number of possible images stored by the platform 10 or a network server. In this case, the index would be fetched by the trusted device 24 across a secure channel and decrypted in order to retrieve and display the correct image. Further, the seal data could comprise instructions (for example PostScript™ instructions) that could be interpreted by an appropriately programmed trusted device 24 to generate an image.

Figure 6:
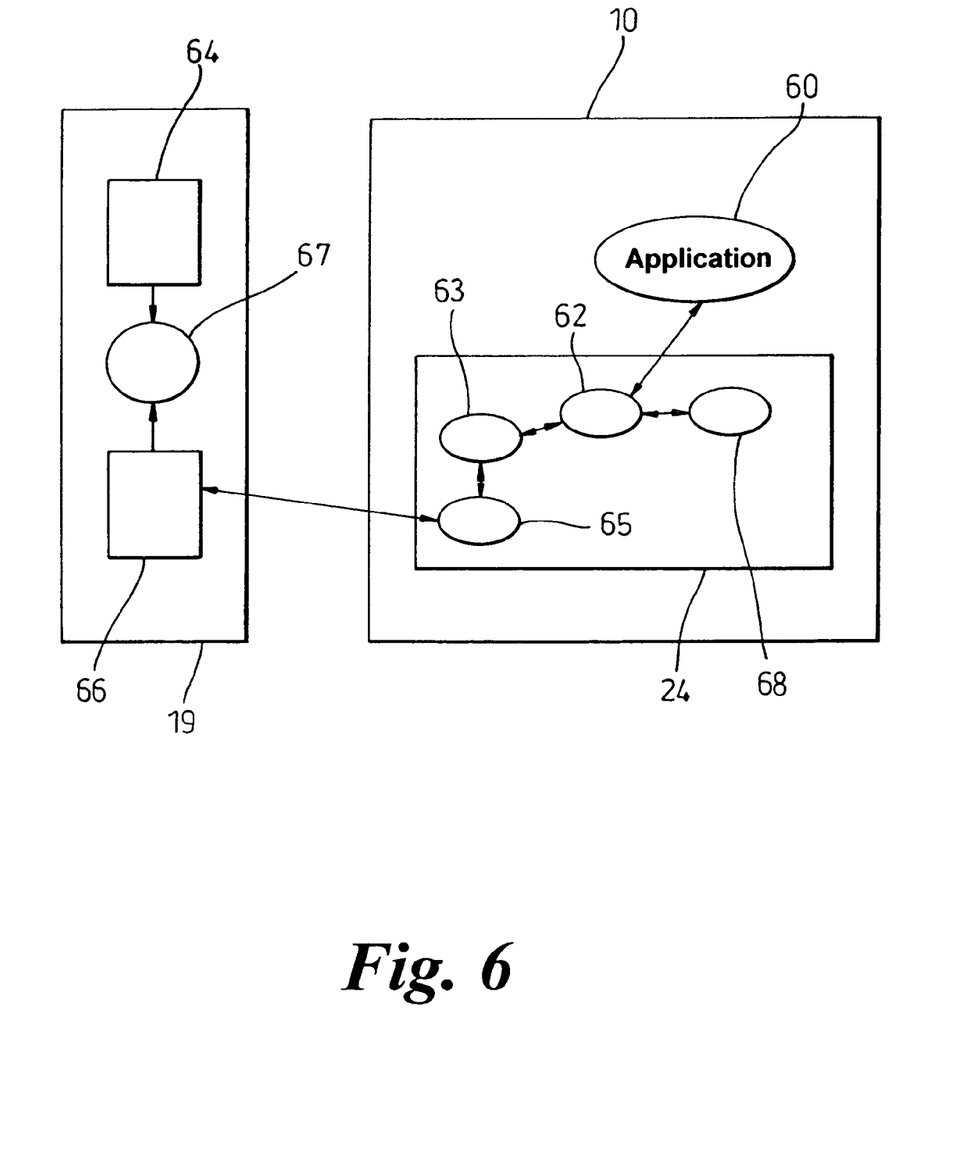
FIG. 6 is a diagram which illustrates a functional architecture of a host computer including a trusted display processor and a smart card suitable for operating in accordance with the preferred embodiment of the present invention.

In accordance with FIG. 6, the platform 10 includes functions provided by the trusted device 24. These functions are: a control process 62 for co-ordinating all the operations of the trusted device 24 and for receiving graphics primitives from a graphics primitives process (not shown) and from an application process 60; a seal process 63 for retrieving seal data 64 from the smartcard 19; a smartcard process 65 for interacting with the smartcard 19 in order to enact challenge/response; and a trusted switch process 68 for monitoring whether the trusted switch 11 has been activated by the user. The smartcard process 65 has access to the trusted device's 24 identity data $I_{DP}$, private key $S_{DP}$ data and certificate $Cert_{DP}$ data 530. In practice, the smart card and the trusted device interact with one another via standard operating system calls.

The smartcard 19 has: seal data 64; a display processor process 67 for interacting with the trusted device 24 to enact challenge/response and data signing tasks; smartcard identity data $I_{SC}$, smartcard private key data $S_{SC}$ and smartcard certificate data $Cert_{SC}$ 66.

A preferred process for recovering seal data using the arrangement shown in FIGS. 1 to 6 will now be described:

the control process 62 calls the seal process 63, and the seal process 63 calls the smartcard process 65, to recover the seal data 64 from the smartcard 19. Optionally, the control process 62 calls the generate pixmap process (not shown) to display another message indicating to the user that recovery of the seal data 64 is being attempted. The smartcard process 65 the trusted device 24 and the display processor process 67 of the smartcard 19 interact using well known, 'challenge/response' techniques to enact mutual authentication and pass the seal data 64 from the smartcard and back to the control process 62. The details of the mutual authentication process and passing of the seal data 64 will now be described with reference to FIG. 7.

Figure 7:
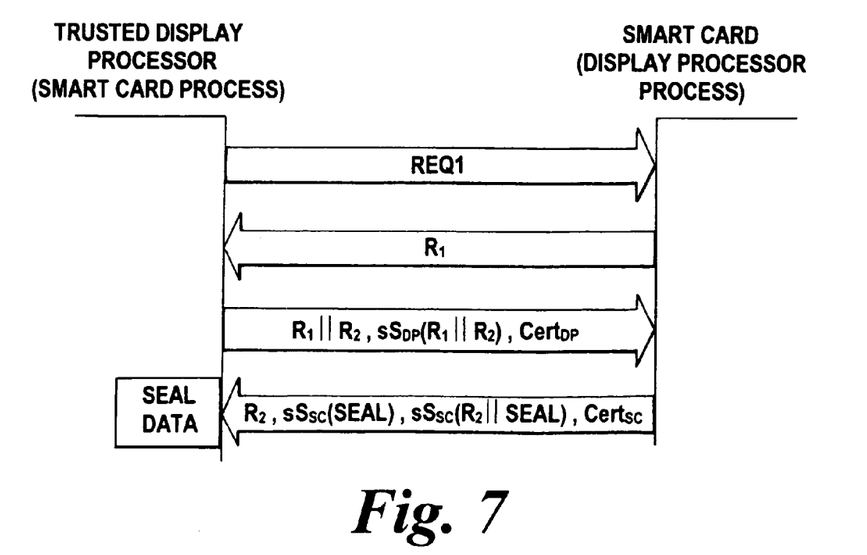
FIG. 7 is a flow diagram which illustrates the steps involved in displaying seal data.

According to FIG. 7, the smartcard process 65 sends a request REQ1 to the smartcard 19 to return the seal data SEAL 64. The display processor process 67 generates a nonce $R_1$ and sends it in a challenge to the smartcard process 65. The smartcard process 65 generates a nonce $R_2$ and concatenates it with nonce $R_1$, signs the concatenation $R_1\|R_2$ with its private key to produce a signature $sS_{DP}(R_1\|R_2)$, and returns the concatenation $R_1\|R_2$, the signature $sS_{DP}(R_1\|R_2)$ and the certificate $Cert_{DP}$ back to the display processor process 67 of the smartcard 19. The display processor process 67 extracts the public key of the trusted device 24 from the certificate $Cert_{DP}$ 350, and uses this to authenticate the nonce $R_1$ and the signature $sS_{DP}(R_1\|R_2)$ by comparison with the concatenation $R_1\|R_2$, to prove that the seal request came from the expected trusted device 24 and that the trusted device 24 is online.

The nonces are used to protect the user from deception caused by replay of old but genuine signatures (called a 'replay attack') by untrustworthy processes.

The display processor process 67 of the smartcard 19 then concatenates $R_2$ with its seal data SEAL 64, signs the concatenation $R_2\|SEAL$ using its private key $S_{SC}$ to produce a signature $sS_{SC}(R_2\|SEAL)$, encrypts the seal data SEAL 64 using its private key $S_{SC}$ to produce encrypted seal data 64 $sS_{SC}(SEAL)$, and sends nonce $R_2$, the encrypted seal data $sS_{SC}(SEAL)$, the signature $sS_{SC}(R_2\|SEAL)$ and the smartcard's certificate $Cert_{SC}$ to the smartcard process 65 of the trusted device 24. The smartcard process 65 extracts the smartcard's public key from the certificate $Cert_{SC}$ and uses this to verify nonce $R_2$ and the signature $sS_{SC}(R_2\|SEAL)$, decrypt the seal data SEAL 64 from the encrypted seal data 64 $sS_{SC}(SEAL)$ and, finally, return the seal data SEAL 64, via the seal process 63, to the control process 62 for displaying on the VDU 18.

Below is described an example of a consumer wishing to buy some goods from a vendor, via a payment terminal 10 based in a shop, using the customers smartcard 19 to ensure a secure payment transaction is established. To make a payment, the consumer is asked to insert his smart card 19 into the smart card reader 12. After the consumer does this, an image with a special seal generated by the smart card 19 and previously unknown to the payment terminal 10 is displayed on the VDU 18, confirming to the consumer that the smart card 19 is satisfied that the checkout box can be trusted, as described above. Optionally, this special image can further confirm to the consumer that the remote bank platform (not shown), which takes part in this payment process, can be trusted as well.

On inputting the details or code of the goods into either the smartcard 19 or the payment terminal 10, an image with another special seal, again generated by the smart card 19 and previously unknown to the payment terminal 10, is displayed on the VDU 18, confirming to the consumer that the smart card 19 knows the price and product information. Associated with this image is a button, probably a hardware switch that the consumer must press in order to authorise continuing the procedure of purchasing goods, for example the switch 11, however the button may be associated with a switch on smartcard 19. In response to pressing the button, the payment is completed.

For the purposes of authentication and key distribution, each entity has the following asymmetric key pairs: the CA (not shown) has a RSA key pair for signature and verification, the SC 19 has a RSA key pair for signature and verification and each of TC1 10 and TC2 (not shown) has at least a RSA key pair for signature and verification, or optionally, has two RSA key pairs respectively for signature-verification and encryption-decryption.

A preferred protocol for implementing the above described preferred embodiment is described below. This protocol includes the security mechanisms of authentication amongst SC, TC1 and TC2, integrity checking of the checkout box with TC1 and the remote bank platform with TC2, and establishment of a transaction of the payment.

On a consumer inserting the smart card into the smart card reader of the payment terminal to make a purchase TC1 of the payment terminal initiates the protocol by sending SC a first message containing (1) a command $CMD_1$, which is used to indicate different services and preferably including product description, service type, price and payment methods; (2) a newly generated nonce $N_{1-TC\ 1}$, and (3) the TC's certificate Cert(TC1) (if SC does not have this certificate yet).

Upon receipt of the first message from TC1, SC replies to TC1 with a second message containing a newly generated nonce $N_{2-SC}$, the name of TC2 and the SC's certificate Cert(SC) (if TC1 does not have this certificate yet). After receiving the second message 2, the payment terminal box connects to the remote bank platform.

On connection TC2 of the remote bank platform sends to TC1 a third message containing a newly generated nonce $N_{3-TC2}$ and TC2 certificate Cert(TC2) (if TC1 hasn't got this certificate yet).

In reply the third message TC1 sends TC2 a fourth message containing the command $CMD_1$, the nonce $N_{2-SC}$ and the SC's certificate Cert(SC), forwarded from SC's message, and TC1's own certificate Cert(TC1) (if TC2 does not have this certificate).

Upon receipt of the fourth message, TC2 sends to TC1 a fifth message containing the integrity metric of the remote bank platform $IM_{TC2}$ and a signature of $CMD_1$, $N_{2-SC}$, $N_{3-TC2}$, User, TC1, $IM_{TC2}$–$\{S_{TC2}(CMD_1, N_{2-SC}, N_{3-TC2}User, TC1, IM_{TC2})\}$.

After receiving of the fifth message, TC1 sends to SC a sixth message containing $N_{3-TC2}$, $IM_{TC1}$, $IM_{TC2}$, Cert(TC2), $S_{TC1}(CMD_1, N_{2-SC}, N_{1-TC1}$, User, TC2, $IM_{TC1})$, $S_{TC2}(CMD_1, N_{2-SC}, N_{3-TC2}, User, TC1, IM_{TC2})$ Upon receipt of the sixth message, SC verifies both signatures signed by TC1 and TC2 $S_{TC1}$ $S_{TC2}$. This allows the SC to authenticate and to perform an integrity check on TC1 and TC2. If the verification is successful SC makes a signature of $CMD_1$, $N_{1-TC1}$, $N_{3-TC2}$, $N_{2-SC}$, TC1, TC2, $E_{TC1}(TID, SK1)$, $E_{TC2}(SK2)$—$\{S_{SC}(CMD_1, N_{1-TC1}, N_{3-TC2}, N_{2-SC}$, TC1, TC2, $E_{TC1}(TID, SK1$ ), $E_{TC2}(SK2)\}$—including all the nonces being used in this session and two encrypted data respectively for TC1 and TC2. SC sends this signature $\{S_{SC}(CMD_1, N_{1-TC1}, N_{3-TC2}, N_{2-SC}$, TC1, TC2,$E_{TC1}(TID, SK1)$, $E_{TC2}(SK2)\}$ in a seventh message to TC1.

1. TC1→TC2: $S_{SC}(CMD_1, N_{1-TC1}, N_{3-TC2}, N_{2-SC}$, TC1, TC2)

After receiving of the seventh message, TC1 forwards the signature $S_{SC}(CMD_1, N_{1-TC1}, N_{3-TC2}, N_{2-SC}$, TC1, TC2, $E_{TC1}(TID, SK1)$, $E_{TC2}(SK2)$ to TC2. Both TC1 and TC2 then verify SC's signature. If this part of the protocol succeeds, TC2 will take the payment.

If during the flow of the above transaction protocol any verification or check is not successful, the corresponding verifier will make an announcement to let the other entities know what happens and then the protocol aborts.

If the information of the payment transaction is sensitive to any other party, the communications between TC1 and TC2 can be protected, for example by using an encrypted channel. In this case, TC1 and TC2 can use their RSA encryption-decryption key pairs to establish an authenticated shared session key, and then use this session key to protect all message flows between them.

Optionally, such technology can be incorporated with wireless technology such as Bluetooth (a wireless transmitter/receiver programmed to allow a free flow of data without bulky cables, and designed to work anywhere). Using the protocol above with a (long-distance) wireless personal device instead of a smart card or connected personal device, transactions (payments) are brought to the consumer instead of the consumer having to make payments at fixed points.

What is claimed:

1. A method for allowing a financial transaction to be performed using a electronic system, the method comprising:
   interrogating an electronic transaction terminal with an electronic security device to obtain an integrity metric for the transaction terminal measured by a trusted device contained within the transaction terminal after the last restart of the transaction terminal;
   determining if the transaction terminal is a trusted terminal based upon the integrity metric; and
   allowing financial transaction data to be input into the transaction terminal if the transaction terminal is identified as a trusted terminal.

2. A method according to claim 1, further comprising:
   providing user identification data for the user of the electronic security device to the transaction terminal via the security device to allow authorisation of the transaction associated with the financial transaction data.

3. A method according to claim 1, further comprising:
   displaying a user secret if the transaction terminal is identified as a trusted terminal.

4. A method according to claim 1, further comprising:

compartmenting different types of transactions into different compartments.

5. A financial transaction system, comprising:

an electronic financial transaction terminal; and an electronic security device having interrogation means for interrogating the transaction terminal to obtain an integrity metric for the transaction terminal measured by a trusted device contained within the transaction terminal after the last restart of the transaction terminal, determining means for determining if the transaction terminal is a trusted terminal based upon the integrity metric, and means for allowing financial transaction data to be input into the transaction terminal if the transaction terminal is identified as a trusted terminal.

6. A financial transaction system according to claim 5, wherein the electronic financial transaction terminal further comprises a display for displaying a user secret if the transaction terminal is identified as a trusted terminal.

7. A financial transaction system according to claim 6, wherein the user secret is deleted on completion of the financial transaction.

8. An electronic security transaction device having interrogation means for interrogating an electronic financial transaction terminal to obtain an integrity metric for the transaction terminal measured by a trusted device contained within the transaction terminal after the last restart of the transaction terminal, determining means for determining if the transaction terminal is a trusted terminal based upon the integrity metric, and means for allowing financial transaction data to be input into the transaction terminal if the transaction terminal is identified as a trusted terminal.

9. An electronic security transaction device according to claim 8, further comprising a switch for initiating the transfer of financial transaction data to the transaction terminal if the transaction terminal is identified as a trusted terminal.

10. An electronic security transaction device according to claim 8, wherein the transaction device is a wireless trusted personnel device.

* * * * *